United States Patent [19]

Yokogawa et al.

[11] Patent Number: 6,029,388
[45] Date of Patent: Feb. 29, 2000

[54] LIGHT-EMITTING FISHING LURE

[75] Inventors: Seiji Yokogawa, Takatsuki; Isamu Kawata, Neyagawa; Junichi Matsumoto, Katano, all of Japan

[73] Assignee: Matsushita Electric Industrial Co., Ltd., Osaka, Japan

[21] Appl. No.: 09/101,227

[22] PCT Filed: Jan. 16, 1998

[86] PCT No.: PCT/JP98/00159

§ 371 Date: Jul. 2, 1998

§ 102(e) Date: Jul. 2, 1998

[87] PCT Pub. No.: WO98/31218

PCT Pub. Date: Jul. 23, 1998

[30] Foreign Application Priority Data

Jan. 17, 1997 [JP] Japan ................... 9-006012

[51] Int. Cl.⁷ ................ A01K 75/02; A01K 85/00
[52] U.S. Cl. ............................. 43/17.6; 43/17.5
[58] Field of Search ...................... 43/17.6, 17.5

[56] References Cited

U.S. PATENT DOCUMENTS

| | | | |
|---|---|---|---|
| 2,740,220 | 4/1956 | Caplan | 43/17.6 |
| 2,754,610 | 7/1956 | Carlson | 43/17.6 |
| 3,040,462 | 6/1962 | Guida | 43/17.6 |
| 3,077,046 | 2/1963 | Murray | 43/17.6 |
| 4,227,331 | 10/1980 | Ursey et al. | 43/17.6 |
| 4,234,913 | 11/1980 | Ramme | 43/17.6 |
| 4,437,256 | 3/1984 | Kulak | 43/17.6 |
| 4,536,985 | 8/1985 | Caviness | 43/17.6 |
| 4,727,674 | 3/1988 | Garr | 43/17.6 |
| 4,811,513 | 3/1989 | Grobl | 43/17.6 |
| 4,972,623 | 11/1990 | Delricco | 43/17.6 |
| 5,157,857 | 10/1992 | Livingston | 43/17.6 |
| 5,175,951 | 1/1993 | Fruchey | 43/17.6 |
| 5,299,107 | 3/1994 | Ratcliffe et al. | 43/17.6 |

FOREIGN PATENT DOCUMENTS

| | | |
|---|---|---|
| 51-60484 | 5/1976 | Japan . |
| 53-142485 | 4/1977 | Japan . |
| 53-987 | 1/1978 | Japan . |
| 55-117270 | 8/1980 | Japan . |
| 59-34830 | 2/1984 | Japan . |
| 59-52866 | 4/1984 | Japan . |
| 59-145174 | 9/1984 | Japan . |
| 5-2669 | 1/1993 | Japan . |
| 21785 | 10/1911 | Norway ................ 43/17.6 |
| 759073 | 9/1980 | U.S.S.R. ................ 43/17.6 |
| 822798 | 4/1981 | U.S.S.R. ................ 43/17.6 |

*Primary Examiner*—Michael J. Carone
*Assistant Examiner*—Fredrick T. French, III
*Attorney, Agent, or Firm*—Jordan and Hamburg LLP

[57] ABSTRACT

It is an object of the present invention to provide a lure (A) which does not require batteries to be changed, and a lure (B) wherein the changing of batteries has been simplified. Lure (A) is structured in such a manner that a solar battery (10) housed within a fish-shaped case (1) serves to charge a secondary battery (11), thus rendering it unnecessary to change batteries. Meanwhile, lure (B) is structured in such a manner that a lid unit (23) holding a battery (24) and a light-emitting body (25) can be inserted into and released from an aperture within a fish-shaped case (21), it being possible to remove the battery (24) when the lid unit (23) is released, thus permitting the easy changing of batteries without the need for exaggerated action and without any risk of injuring the fingers on hooks (5). These lures are structured such as to have an illuminated band stretching from either side of the head, which is shaped in imitation of a fish, towards the underside, and thus facilitate improved efficacy in luring fish by means of a light-emitting lure.

16 Claims, 5 Drawing Sheets

LIGHT-EMITTING FISHING LURE

TECHNICAL FIELD

The present invention relates to a lure, being an artificial bait for use in fishing, and in particular to a lure provided with a light-emitting facility which is effective in attracting fish.

BACKGROUND ART

Fishing with a lure, artificial bait which imitates the shape of a small fish, involves manipulating the lure to make it look as if it were a live small fish. In this manner, the fish it is desired to catch, which feed on smaller fish, are attracted and caught. Lure fishing requires the angler to take into consideration the type of fish he wishes to catch, the conditions in the fishing place, the season, time of day, weather and other variable elements in addition to technical factors such as the sort of action of the lure the fish are likely to be attracted by, and to make full use of his tackle accordingly. It is especially important that the lure is capable of catching the attention of the fish and inducing an appetite. Inasmuch as with artificial bait it is impossible to appeal to the fish's sense of smell, the emphasis comes to be placed on appealing to the senses of sight and hearing. Consequently, the function required of it is that pulling on the line should cause it to behave in the manner of a small fish, while reflecting the light and emulating the sound of swimming in such a way as to attract the larger fish.

Reflection of light is effective in attracting fish, but the effect is diminished because of the relatively small amount of natural light which the lure is able to reflect when moving within the water. Moreover, it is impossible to utilise natural light during the hours from dusk into the night and at dawn, when the best catch is expected. Lures equipped with internal light-emitting bodies have been developed in order to enhance the effect of luring fish with the aid of light irrespective of such changes of condition. Some make use of light generated by means of chemical reaction, but greater stability of light is obtained if a battery and a light-emitting diode using the battery as a power source are housed within the lure.

The lure illustrated in FIGS. 10 and 11 is one which was disclosed in Japanese Utility Model publication Jikkaisho 53-142485. As may be seen from FIG. 10, a light-emitting body and battery are housed within a fish-shaped case which resembles a small fish, and for this reason the fish-shaped case is formed in such a manner that it can be divided into a head section 41 and a tail section 42. Hooks 43 are suspended from the abdomen side of the head section 41 and from the tail section 42 respectively. Inside the fish-shaped case, as may be seen from FIG. 11, are housed a light-emitting diode 44 and a battery 48. The battery 48 acts as the power source to illuminate the light-emitting diode 44, so that portions light up on either side of the head, which viewed from the outside correspond to the fish's eyes.

The aforesaid head section 41 and tail section 42 are structured in such a manner as to screw into each other to form a single body, a male screw 41a formed on the head section 41 engaging with a female screw 42a formed on the tail section 42. In order to change the battery 48, the tail section 42 is unscrewed from the head section 41 to expose the battery 48 which is held within the head section 41, the spent battery 48 is extracted from a battery fitting 45, a new battery 48 is inserted into the battery fitting 45, and the tail section 42 is screwed back on to the head section 41. When the lure is not in use, unnecessary battery consumption is prevented by fitting the end of the cylindrical battery 48 which has no electrode into the battery fitting 45, thus releasing the connection with the light-emitting diode 44. When it is in use, as FIG. 11 demonstrates, the end of the battery 48 which has the electrode is inserted into the battery fitting 45 in order to allow the light-emitting diode 44 to illuminate. The operation of switching between on and off in the light-emitting diode 44 is also accomplished by attaching and detaching the head section 41 and the tail section 42.

Batteries of large size cannot be used for a light-emitting lure, because the battery is housed within a small case made to resemble a small fish. Even lithium batteries, which have a large capacity in relation to their volume, last only a few hours if the light-emitting diode is kept on continuously, and the battery needs changing frequently. In order to reduce battery consumption it is necessary to switch the light-emitting diode on and off diligently. The operations of changing the battery and switching the light-emitting diode on and off require the case to be opened and the battery attached or detached. Not only is unscrewing the tail section 42 from the head section 41 as hitherto a time-consuming operation, but it involves rotating the tail section 42 to which a hook 43 is attached. It is problematic in that there is a risk of injuring the fingers with the hook 43 or getting the hook 43 fast in one's clothing during the operation.

Moreover, illuminating the lure on either side of the head with the aid of a light-emitting diode makes it easier to recognise for fish swimming by the side of its body, but this is not true of fish swimming behind it and following the fish which are actually showing interest, so that there are problems of decreased efficacy in attracting fish.

The present invention has been designed in view of the abovementioned problems, and seeks to provide a light-emitting lure which does not require batteries to be changed. At the same time it also seeks to provide a light-emitting lure which, while requiring the battery to be changed, is structured in such a manner that this can be accomplished easily and safely. Both serve to increase the efficacy of luring fish by means of light.

DISCLOSURE OF INVENTION

With a view to attaining the abovementioned aims, the present invention is a lure having a light-emitting body, which emits light with a battery as a power source, housed within a fish-shaped case formed of a translucent material into a shape resembling a fish, characterised in that it is provided within the aforesaid fish-shaped case with a solar battery, a secondary battery which is charged by this solar battery, a means of driving light emission which serves to illuminate a light-emitting body with the secondary battery as the power source, and a means of control which serves to switch the secondary battery between charge and discharge states, a design imitating the body of a fish being depicted on the surface of the fish-shaped case, leaving translucent a portion facing the light-receiving surface of the aforesaid solar battery and a prescribed portion through which light from the aforesaid light-emitting body is radiated.

In the abovementioned structure, the means of driving light emission serves to illuminate a light-emitting body with the secondary battery as the power source, while operating the means of control allows this secondary battery to be charged with electricity output from the solar battery. This makes it possible to structure the lure in such a manner that the light-emitting body is illuminated without changing the battery. The fish-shaped case is formed of a translucent material into a shape resembling a fish, and a design imitating the body of a fish is depicted on its surface, leaving translucent a portion through which solar light is incident upon the light-receiving surface of the solar battery and a prescribed portion through which light from the light-emitting body is radiated. Thus the lure still resembles a fish and is equipped with a light-emitting facility, while the fact that the battery does not need to be changed means that it can be handled in the same manner as a normal lure.

The means of driving light emission in the abovementioned structure is provided with an oscillator circuit and a booster circuit, the oscillator circuit making it possible by selecting the relevant oscillation frequency to cause the light-emitting body to flash, thus improving the efficacy of the lure. Moreover, it is also possible to utilise changes in voltage induced by the oscillation circuit in order to raise the voltage to a sufficient level to permit the light-emitting body to flash. This means that the output voltage of the secondary battery used may be low, allowing the lure to be kept compact and the cost reduced.

Furthermore, the lure is structured in such a manner that a means of water detection is provided in order to detect continuity between a pair of electrodes which protrude from the surface of the fish-shaped case, the means of control being operated by this means of water detection. Accordingly, the means of water detection detects that the lure has been cast into the water, this operates the means of control, and the secondary battery switches to discharge mode, thereby illuminating the light-emitting body. Thus it is possible to ensure that the action of casting the lure into the water automatically causes it to begin flashing.

In order to achieve the abovementioned object, the lure according to the present invention is structured in such a manner that a light-emitting body is located within a fish-shaped case on a head side, which is formed into a shape resembling a fish, a stretch of surface of the fish-shaped case from either side of its head towards the underside being illuminated by light from the light-emitting body.

By virtue of this structure the light-emitting lure comes to be illuminated by light from the light-emitting body in a band which stretches from either side of the head of the fish-shaped case towards the underside. The bright lighting conditions on both sides ensure that the lure is visible to passing fish over a wide range in either direction laterally, while their position on the sides of the head ensure that they do not shine too brightly to attract fish which have shown interest and are following the lure. In other words, it is possible to obtain a light-emitting effect which matches the predatorial behaviour of the fish by emitting a bright light to appeal to their perception of movement at a distance, while not interfering with their perception of shape once they enter the chase.

In order to attain the abovementioned object, the lure of the present invention is constructed to have a light-emitting body which emits light with a battery as a power source, housed within a fish-shaped case formed into a shape which resembles a fish, and is provided with a main body and a lid unit which serves to close an aperture whereby an internal space formed within this main body is open to the exterior, it being possible to attach and detach this lid unit by inserting a prescribed part thereof into and releasing this prescribed part from the aforesaid main body in the longitudinal direction thereof.

The abovementioned structure serves to facilitate the operation of attaching and detaching the battery in a light-emitting lure of a type which involves changing the battery. The operations of changing the battery and switching the light-emitting body on and off can be accomplished swiftly and simply by removing the lid unit from the main body to attach or detach the battery, and then inserting the lid unit into the main body in the prescribed position. This permits of a structure such that the operation involved is not one of screwing or any other exaggerated action of the fingers, but simply of removing and replacing the lid unit, which has no hooks attached to it. Thus, it is possible to change the battery and switch the light-emitting body on and off simply and safely without any risk of injuring the fingers with a hook or getting a hook fast in one's clothing.

In the abovementioned structure, the aperture is provided with a flange protruding from the internal periphery of the aperture towards the center thereof, and a spring member having an energising force which acts in a direction intersecting at right-angles the direction wherein the lid unit is inserted and released, a prescribed position on the lid unit coming into close contact with the aforesaid flange by virtue of the fact that the aforesaid spring member engages with a concave section formed in the aforesaid prescribed position on the lid, thus serving to close the aperture tightly and hold the lid member on to the main body. The fact that the lid unit is inserted and released unidirectionally means that it is not only possible to maintain a watertight structure within the fish-shaped case, but the lid unit is retained firmly in the main body.

In this structure, an O-ring is provided in a prescribed position on the lid unit which contacts closely with the flange. This permits of an enhanced degree of watertightness.

Moreover, the structure is such that the lid unit has a notch into which a fingernail may be inserted in order to release it from the main body.

Furthermore, the structure is such that the battery and the light-emitting body are retained by the lid unit, while the lid unit is fitted into the main body, thus allowing the battery and the light-emitting body to fit in their prescribed positions within the fish-shaped case. Thus, releasing the lid unit from the main body allows the battery and light-emitting body to be extracted, simplifying the operations of changing or of attaching and detaching them.

Moreover, a reflective surface is provided closer to a head portion of the fish-shaped case than the position in which the light-emitting body is located, in order to reflect the light from the light-emitting body in the direction of the underside. This serves to enhance the properties of the lure to attract fish with light when they are chasing it.

Furthermore, a plurality of beads is provided in the vicinity of the position in which the light-emitting body is located, in order to scatter the light. Thus, the plurality of beads dances in response to the sway as the lure moves, scattering the light and at the same time generating vibration and noise, which serves to enhance the efficacy of the lure in attracting fish.

BEST MODES FOR CARRYING OUT THE INVENTION

The lure according to the first embodiment of the present invention will be described with reference to FIGS. 1, 2 and 3.

Figure 1:
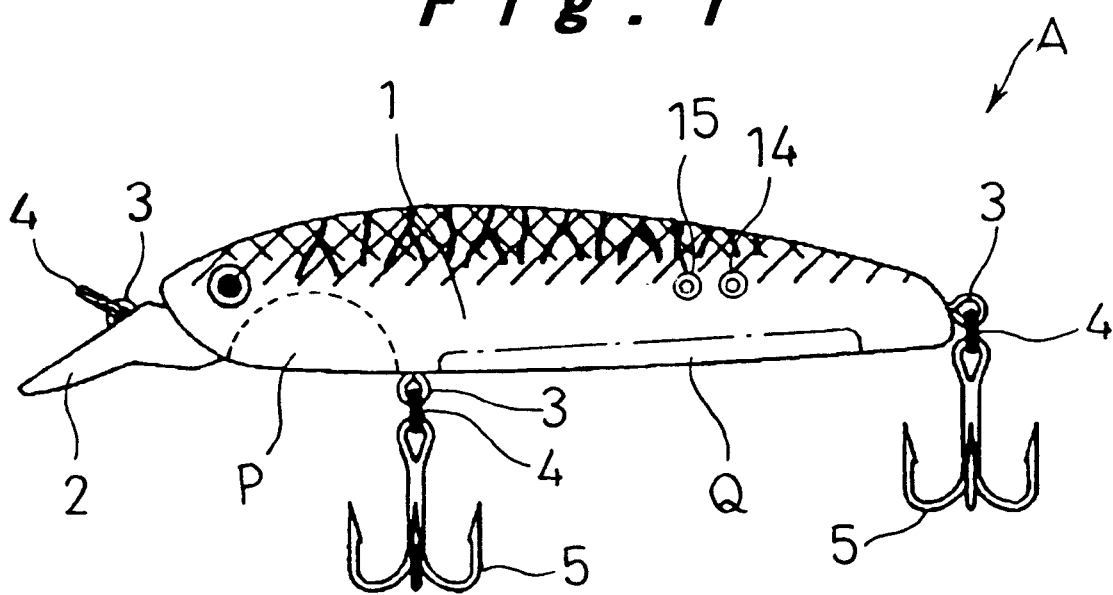
FIG. 1 is a side view illustrating the external appearance of the lure according to a first embodiment.

In FIG. 1, a lure A according to the first embodiment is structured as a minnow-type lure which is operated by an angler with the aid of a line connected to a split ring 4 so as to bob up and down in the water and emulate the swimming of a fish. The surface of the main case 1, which is formed from a translucent material in the shape of a fish, has depicted on it a pattern which imitates the external appearance of a fish, while certain prescribed portions are left translucent. Hooks 5, 5 are suspended from the tail and abdomen sections respectively. Fish attracted to feed on this lure A, or artificial bait made to resemble the body of a fish, become entangled on the hooks 5 and are caught.

The aforesaid main case 1 is structured in such a manner as to be divided left and right down a central line from the head to the tail of the fish shape to create hollow left and right cases, wherein concave and convex sections formed in corresponding positions left and right respectively engage with each other while the surrounding opposing faces adhere to create a single tight hollow fish-shaped case. During the process of assembling the left and right cases into a single fish-shaped case, rings on one side of metal eyelets 3 are inserted into recesses formed in the head, abdomen and tail respectively, as FIG. 2 demonstrates. To rings on the other side, which protrude externally from the main case 1, are attached split rings 4. The split ring 4 on the head is for the purpose of connecting the aforesaid line, while the aforesaid hooks 5, 5 are suspended respectively from the split rings 4, 4 on the abdomen and tail. A lip 2, which protrudes in the shape of a tongue forward from the head is characteristic of the structure of minnow-type and similar submersible lures, allowing the degree of roll of the lure A and the depth to which it dives to vary in accordance with the resistance of the water when it is pulled with the aid of the line. By changing the shape and angle of this lip 2 it is possible to determine the action of the lure in attracting fish.

Figure 2:
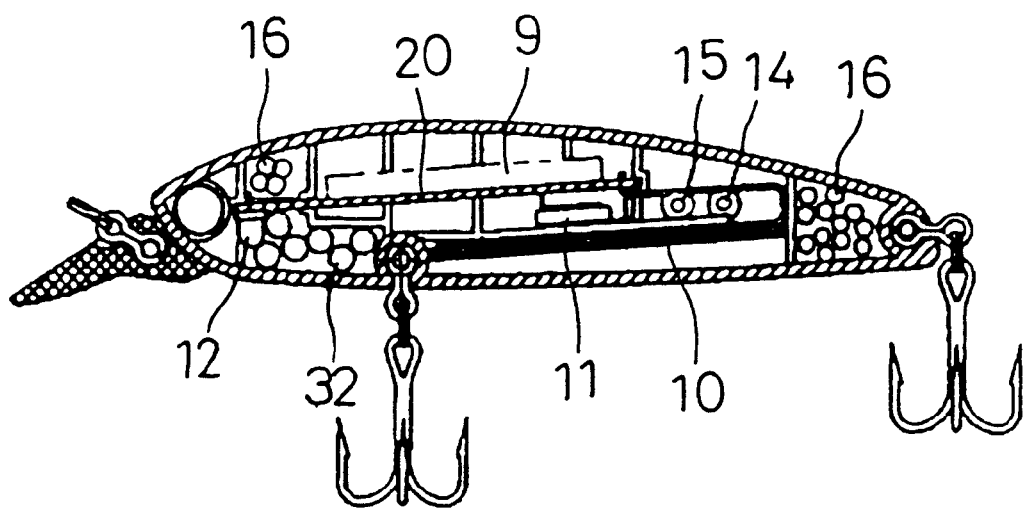
FIG. 2 is a cross-sectional structural diagram illustrating the internal configuration of the lure to which the first embodiment pertains.

As may be seen from FIG. 2, within the main case 1 of the aforesaid structure are housed a solar battery 10, a secondary battery 11, an electronic circuit 9 mounted on a circuit substrate 20, a light-emitting diode (light-emitting body) 12 and other elements. A pair of electrodes 14, 15 which constitutes a means of water detection is built into the wall of the main case 1, one end of each of them protruding outwards from the main case 1. The other ends are connected to the electronic circuit 9 so that when the lure A is cast into the water, the continuity between the two electrodes 14, 15 which the water provides serves to detect the fact that it is in the water. Each of the elements housed within the main case 1 is held in its prescribed position by virtue of holding members formed within the main case 1, and partitions are provided so that each element may sit in its prescribed position. A plurality of glass beads 32 is provided within a partition placed lower down the head section where the light-emitting diode 12 is located. These not only serve to disperse the light emitted by the light-emitting diode 12, but move around within the partition in accordance with the movement of the light-emitting lure, thus causing the dispersed light to move and generating vibration and noise. Partitions located in the head and tail sections contain silica gel 16, which serves to absorb moisture within the sealed main case 1, protecting the electronic circuit 9, solar battery 10 and other elements from moisture resulting from condensation.

On the surface of the main case 1 is depicted a pattern imitating the external appearance of a fish, while leaving translucent the lower surface of the main case 1 facing the light-receiving surface of the solar battery 10 (a light-receiving portion Q within the area enclosed by the dot-and-dash line in FIG. 1) and a band stretching from either side of the head towards the underside through which light from the light-emitting body 12 is radiated (a light-emitting portion P within the area enclosed by the broken line in FIG. 1). With the exception of the light-receiving portion Q and the light-emitting portion P, which are left translucent, the pattern is depicted in a multiplicity of colors resembling those of a real fish, gradation of color and translucent paint being employed where the pattern impinges on the translucent light-receiving portion Q and light-emitting portion P to avoid creating a sense of discontinuity of coloring and pattern.

Figure 3:
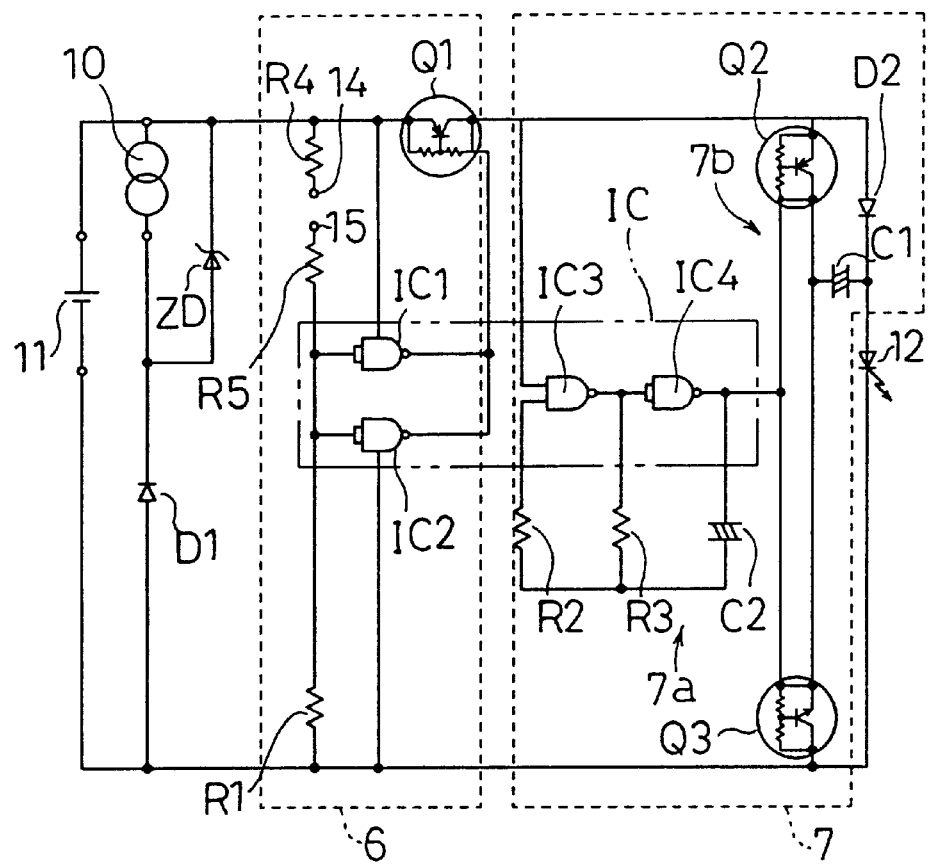
FIG. 3 is a circuitry diagram illustrating the electronic circuitry provided within the lure to which the first embodiment pertains.

FIG. 3 illustrates the configuration of the circuitry housed within the main case 1 which allows the light-emitting portion P of the lure A to be illuminated by the light-emitting diode 12, thus attracting fish. There follows a description of the electrical operation of the lure A with reference to this drawing.

In FIG. 3, the solar battery 10 is parallel-connected to the secondary battery 11 by way of a diode D1. Accordingly, if the lure A is exposed to sunlight with the translucent lower surface upwards, the secondary battery 11 is charged thanks to the electromotive force of the solar battery 10, which has received light from the sun. The aforesaid diode D1 serves to prevent reverse flow whereby the solar battery 10 is charged from the secondary battery 11 if its electromotive force has been reduced by the lure A not being left in the sunlight. Meanwhile, a Zener diode ZD is connected in parallel to the solar battery 10, and serves to suppress the voltage to a constant one set in the Zener diode in order to prevent overvoltage from being impressed on the secondary battery 11 if it is generated from the solar battery 10.

Once the secondary battery 11 has been charged, the lure A may be cast into the water. The water creates continuity between the electrodes 14, 15 which protrude externally from the main case 1. A circuit dividing the output voltage of the secondary battery 11 is formed by resistance R4 and resistance R5 on the one hand, and resistance R1 together with the electrical resistance of the water between the electrodes 14, 15 on the other. The potential of the input terminals of a first element IC1 and a second element IC2 which constitute a logic circuit IC rises, and as a result the potential of the output terminals falls. Consequently, the base current of transistors Q1 connected to each of the output terminals flows, and the transistor Q1 is switched on. These electrodes 14, 15, the resistances R1, R4, R5, the first and second elements IC1, IC2, and the transistor Q1 form a control circuit (means of control) 6, which serves to extinguish the light-emitting diode 12 when the lure A is on land, and automatically to control switching the light-emitting diode 12 on and off when the lure A is cast into the water.

It should be added that if the aforesaid electrodes 14, 15 come into frequent contact with river and sea water containing impurities, reaction with metal ions contained within the impurities causes an insulating film to form on the surfaces which come into contact with the water, and this renders detection of the presence of water through continuity between the electrodes unstable. Accordingly, the electrodes 14, 15 are either gold or gold-plated, which makes it difficult for a film to form on their surface.

The continuity between the electrodes 14, 15 provided by the water allows the control circuit 6 to operate and the transistor Q1 is switched on, as a result of which the potential of the input terminal of a third element IC3 of the logic circuit IC which is connected to the output circuit rises, while the potential of the output terminal falls. Following on from this, the potential of the input terminal of a fourth element IC4 which is connected to the third element IC3 falls, while the potential of the output terminal rises. This allows a capacitor C2 which is connected to the output terminal side to begin charging. This process of charging proceeds at a time constant determined by the values of the capacitor C2 and the resistance R3. The charging potential is returned by way of the resistance R2 to one of the input terminals of the third element IC3, so that when the potential of one of the input terminals of the third element IC3 falls, that of the respective output terminals of the third and fourth elements IC3, IC4 is reversed. This causes the capacitor C2 to discharge, and the potential of the input terminal of the third element IC3 rises. In other words, the third and fourth elements IC3, IC4 constitute an oscillation circuit 7a which oscillates at the frequency of the time constant determined by the capacitor C2 and the resistance R3.

The fact that this oscillation causes the potential of the output terminal of the fourth element IC4 to rise and fall constitutes a booster circuit 7b which alternately activates a pair of transistors Q2, Q3 connected to the output terminal. This is structured in such a manner as to be able to utilise the secondary battery 11 to switch the light-emitting diode 12 on, the secondary battery 11 having a lower output voltage than the operating voltage of the light-emitting diode 12. In other words, when the potential of the output terminal of the fourth element IC4 rises, the transistor Q3 is switched on and the capacitor C1 is charged by way of a diode D2. The light-emitting diode 12 is connected at this point by way of the transistor Q1 and the diode D2 to the secondary battery 11, but there is no flow of current and the light-emitting diode 12 does not illuminate because its operating voltage is higher than the voltage of the secondary battery 11. In passing it may be noted that the operating voltage of the light-emitting diode 12 is 1.7 V, while the secondary battery 11 is a 1.5 V titanium-lithium ion battery.

When the aforesaid oscillation causes the potential of the output terminal of the fourth element IC4 to fall, the transistor Q2 is switched on, the voltage of the secondary battery 11 and that charged by the capacitor C1 are combined, and a voltage roughly twice that of the battery voltage is impressed on the light-emitting diode 12. Thus, the current flows to the light-emitting diode 12 and it is illuminated.

The aforesaid oscillation circuit 7a and booster circuit 7b constitute a light-emission drive circuit (means of driving light emission) 7 which not only serves to illuminate the light-emitting diode 12 with the aid of the secondary battery 11 with low output voltage, but can also cause it to flash. The oscillation frequency of the oscillation circuit 7a which comprises the third and fourth elements IC3, IC4 of the aforesaid logic circuit IC can be altered by selecting the values of the aforesaid capacitor C2 and resistance R3. A high frequency causes the light-emitting diode 12 to flash repeatedly at short intervals, giving the impression of being continuously illuminated, while a lower frequency creates a prescribed interval between the light-emitting diode 12 being illuminated and extinguished, thus causing it to flash. Flashing reduces the total current consumed, allowing the duration of discharge of the secondary battery 11 to be prolonged. This also makes it possible to render both the secondary battery 11 and the solar battery 10, and consequently the light-emitting lure itself, more compact. Flashing also makes it possible to create changes of light, which helps to increase its attractiveness for fish.

The structure of the voltage-doubling booster circuit 7b, utilising voltage output from the oscillation circuit 7a, makes it possible to use the high-tolerance 1.5 V secondary battery 11. It may be pointed out in passing that a 3 V lithium secondary battery, if used, would easily serve to illuminate the light-emitting diode 12, of which the operating voltage is 1.7 V. However, 3 V lithium secondary batteries have strict conditions for charging, and the charging circuitry is complex, with the result that their use would impose restrictions on the compactness of the lure.

As has been described above, the lure A according to the first embodiment is structured in such a manner that the battery which acts as the power source enabling the light-emitting diode to be illuminated is a secondary battery 11 which is charged by means of a solar battery 10. As a result, there is no need to change batteries, and not only is it easy to handle, but it facilitates the cutting of maintenance costs. There is no need for operations to change the battery or switch the light-emitting diode 12 on or off, and the light-emitting diode 12 illuminates automatically when the lure is cast into the water, making it possible to use the lure A with a light-emitting facility in the same way as an ordinary lure.

It is to be noted that in the structure of the abovementioned light-emitting lure A, in a case such that both of the secondary battery 11 and solar battery 10 can output voltage which is greater than the operating voltage of light-emitting diode 12, of which control of charge and discharge can be easily made, as well as that they can be housed within a small lure, there is no need to configure a booster circuit, and the structure of the light-emitting drive circuit 7 can be simplified even further. It is also possible to control switching the light on and off not only automatically with the aid of the means of water detection comprising the electrodes 14, 15, but also by manual switching using a short bar or switch to provide continuity between the electrodes.

In the lure A of the abovementioned structure, the light-emitting diode 12 is located in the head section of the fish-shaped case 1 facing towards the underside, as may be seen from FIG. 2. The light from the light-emitting diode 12 is scattered by means of glass beads 32, and dispersed over a wide area. However, the space in which the light-emitting diode 12 and glass beads 32 are housed is blocked by partitions formed within the fish-shaped case 1 beyond which the circuit substrate 20 and solar battery 10 are located. These block the light, restricting the direction in which it is scattered. Moreover, except for the translucent light-receiving portion Q and light-emitting portion P, the surface of the fish-shaped case 1 is painted, and as a result the light is radiated through the light-emitting portion P. In other words, the light-emitting lure is illuminated in a band stretching from either side of the head towards the underside.

When the lure A with the light-emitting portion P illuminated in this manner is drawn on the end of a line and moves through the water, it is illuminated brightly on both sides so as to be easily recognised by fish over a wide range laterally to the direction in which it is moving. Moreover, since the lure A moves close to the surface of the water, its illuminated underside can be also seen by fish swimming in deeper water. The fish are attracted by the light, and it is their instinct to chase the lure from behind in an attempt to identify it more definitely with both eyes. Since it is the head section which is illuminated, it is not too bright to attract fish which approach and chase it from behind. Once the fish have observed the lure with both eyes and identified it as food, they adopt predatory behaviour, are caught on the hooks 5 and landed. In this manner, the bright light is visible to fish over a wide area, and they are attracted by the dimmer light once they begin chasing the lure. This is an effective method of luring fish, and is particularly suitable for increasing the catch at dawn and dusk.

There now follows, with reference to FIGS. 4–9, a description of the lure according to the second embodiment of the present invention. Elements which are common to the structure of the above first embodiment have been allocated the same reference numerals, and a description of these will be omitted.

Figure 4:
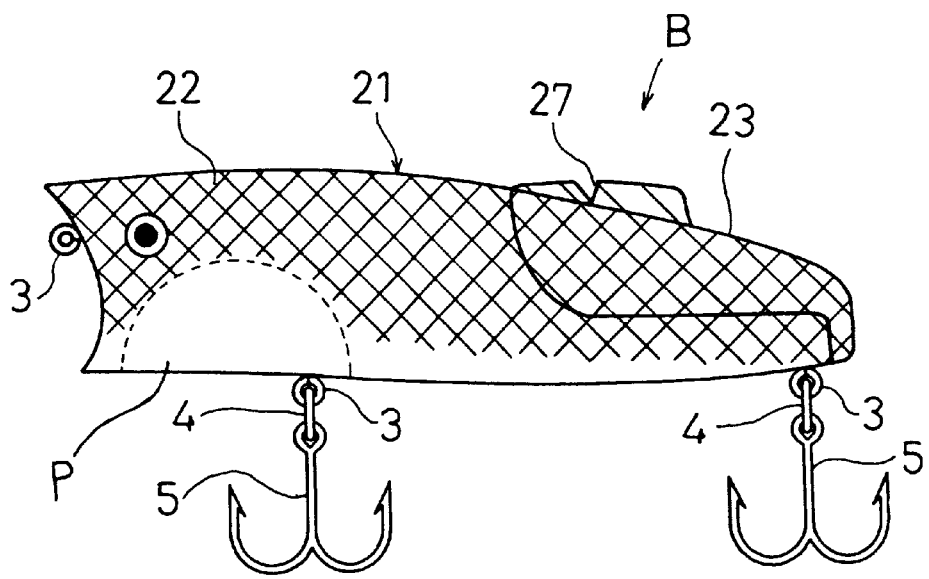
FIG. 4 is a side view illustrating the external appearance of the lure according to a second embodiment.
Figure 5:
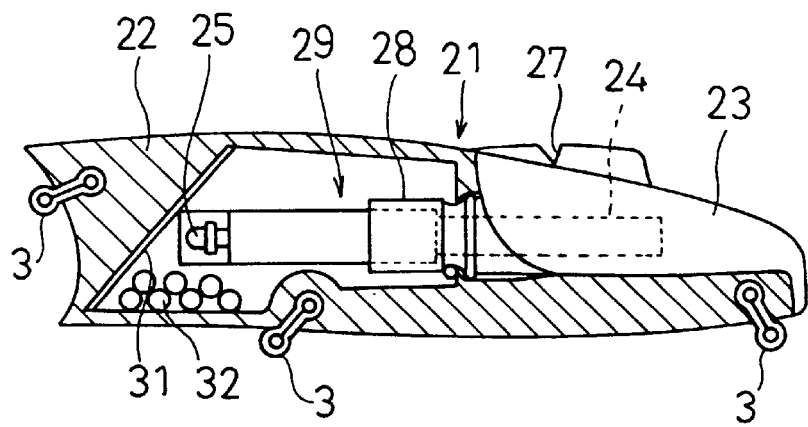
FIG. 5 is a cross-sectional structural diagram illustrating the internal configuration of the lure to which the second embodiment pertains.

FIG. 4 depicts the external appearance of a lure B according to the second embodiment. This is configured as a hopper-type lure, which is used on the surface of the water. This hopper-type lure is formed in the shape of a fish with its mouth open. A line is connected to the metal eyelet 3 which is attached to the head section, and this is used to draw the lure, causing it to bob up and down on the surface of the water, the noise of which attracts the fish. As FIG. 5 shows, it is also a light-emitting lure, which serves to attract fish with the aid of light, to which end it is fitted within the fish-shaped case 21 with a battery 24 and a light-emitting diode 25, the latter having the battery 24 as its power source.

The fish-shaped case 21, which houses the battery 24 and the light-emitting diode 25, is formed from a translucent resin in a shape resembling a fish. It has depicted on it a pattern which imitates the external appearance of a fish, while the light-emitting portion P depicted by a broken line in FIG. 4 stretching from either side of the head towards the underside is left translucent. Hooks 5, 5 are suspended with the aid of split rings 4, 4 from metal eyelets 3 attached to the front and rear sections of the underside. Fish attracted to feed on this lure B become entangled on the hooks 5 and are caught.

The aforesaid fish-shaped case 21 is structured in such a manner as to comprise a main body 22 and a lid member 23 which serves to close an aperture whereby the interior space of the main body 22 opens to the rear. The aforesaid main body 22 is divided left and right down a central line from the head to the tail of the fish-shaped case 21 to create hollow left and right cases, wherein concave and convex sections formed in corresponding positions left and right respectively engage with each other while the surrounding opposing faces adhere to create a tight structure of which only the aforesaid aperture is open to the exterior. During the process of assembling the left and right cases, the aforesaid three metal eyelets 3 for connecting the line and suspending the hooks 5 are fitted, making use of recesses formed in prescribed positions. As is shown in the drawing, the hooks 5 are linked to the aforesaid metal eyelets 3 by way of split rings 4, being attached so as to be capable of swinging freely.

The lid member 23 is structured in such a manner that it can be attached and detached freely in relation to the aforesaid main body 22 by an action of inserting and releasing in the longitudinal direction of the main body 22. When the lid member 23 is fitted on to the main body 22, as may be seen in FIG. 5, the light-emitting diode 25 is housed within the head side of the fish-shaped case 21. The light from the light-emitting diode 25 illuminated with the aid of the battery 24 is reflected by a reflective sheet 31 located on the head side of the light-emitting diode 25, and illuminates the underside, while direct light illuminates both sides of the head. These illuminated portions correspond to the light-emitting portion P (the area delineated by a broken line in FIG. 4) which are left translucent when the design imitating the outward appearance of a fish is painted on to the fish-shaped case 21. The space below the light-emitting diode 25 is filled with glass beads 32, which serve to scatter light and generate vibrations and noise in accordance with the movement of the light-emitting lure B.

Figure 6:
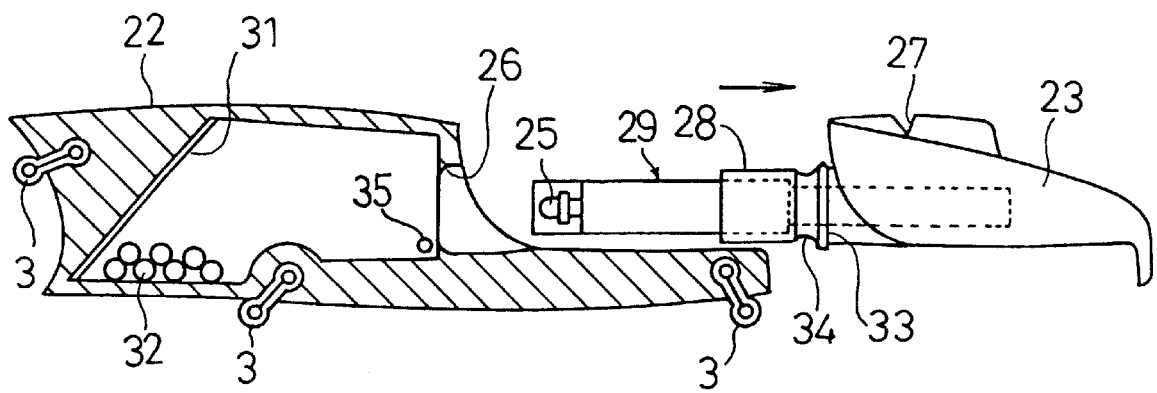
FIG. 6 is a cross-sectional structural diagram depicting the lure to which the second embodiment pertains with the lid unit removed.

FIG. 6 shows the lid unit 23 removed from the main body 22. The operation of releasing the lid unit 23 can be performed by inserting a fingernail into a notch 27 created by cutting away part of a fin-shaped protrusion formed on the top of the lid unit 23. As a result, the operation of attaching and detaching the lid unit 23 can be implemented at a single touch, and it is easily released. The lid unit 23 is fitted to the main body 22 by inserting an insertion member 28 into the aperture 26 whereby the interior space of the main body 22 is open to the rear. Once this is fitted, the edge of the aperture 26 is sealed with the aid of an O-ring 33 attached to the neck of the insertion member 28 so as to be airtight. Meanwhile, a spring member 35 attached to the main body 22 fits into a groove 34, which is formed on the inward side of the ring 33, thus holding the lid unit 23 on.

Figure 7:
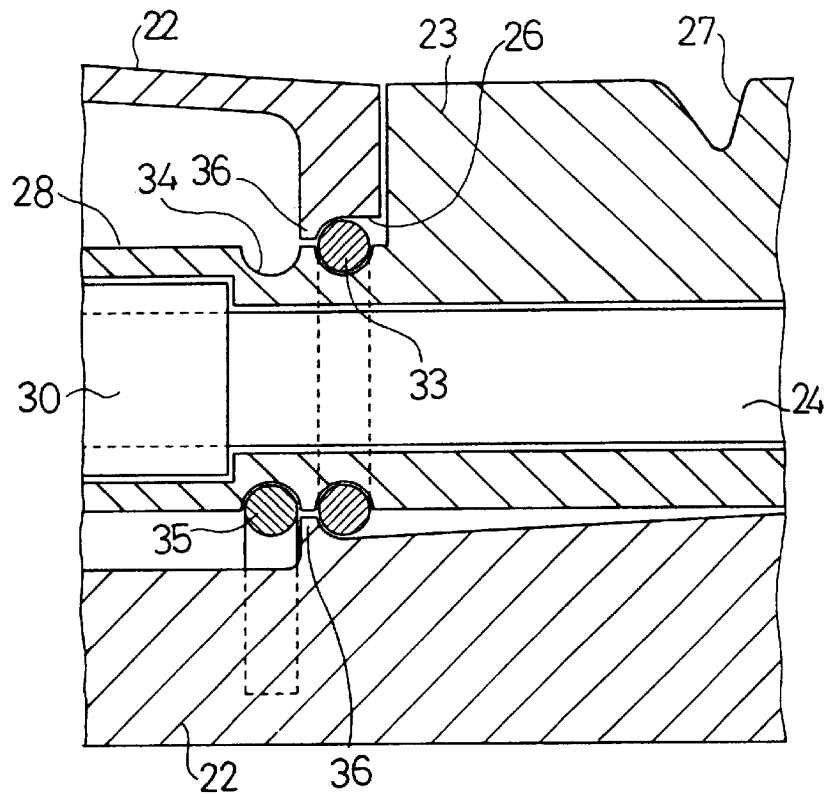
FIG. 7 is a partial cross-sectional diagram depicting the structure whereby the main body of the lure and the lid unit engage in the second embodiment.
Figure 8:
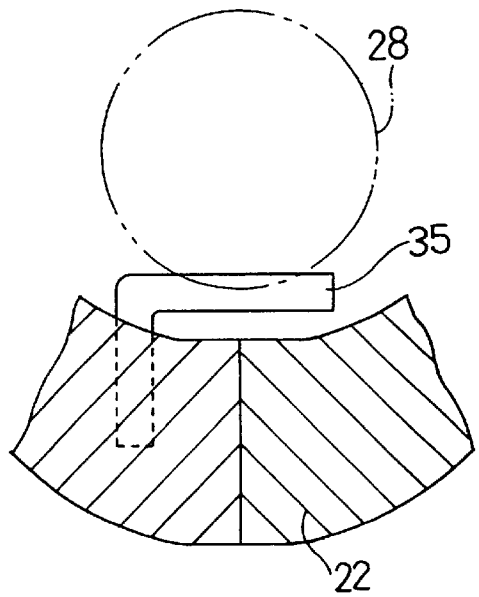
FIG. 8 is a cross-sectional diagram depicting the structure whereby the spring member is attached in the second embodiment.

FIG. 7 is an enlarged representation of the structure whereby the main body 22 and the lid unit 23 engage. Around the neck of the insertion member 28 of the lid unit 23, which is inserted into the aperture 26, is fitted the O-ring 33, while the groove 34 is formed in a circle parallel to the O-ring 33. When the insertion member 28 of the lid unit 23 is inserted into the aperture 26 of the main body 22, the spring member 35, one side of which is embedded and held in the main body 22 so as to be supported as shown in FIG. 8, engages with the aforesaid groove 34, holding the lid unit 23 as if pulling it in the direction in which it has been inserted. Thus, the O-ring 33 adheres tightly to a flange 36 which is formed so as to project from the inner periphery of the aperture 26 in the direction of the center thereof, thus closing the aperture tightly while at the same time holding the lid member 23 fast against the main body 22.

Figure 9:
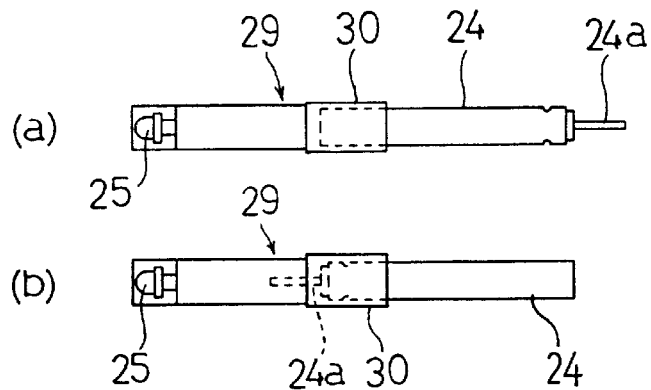
FIG. 9 is an explanatory diagram showing the direction in which the batteries are fitted in the second embodiment.
Figure 10:
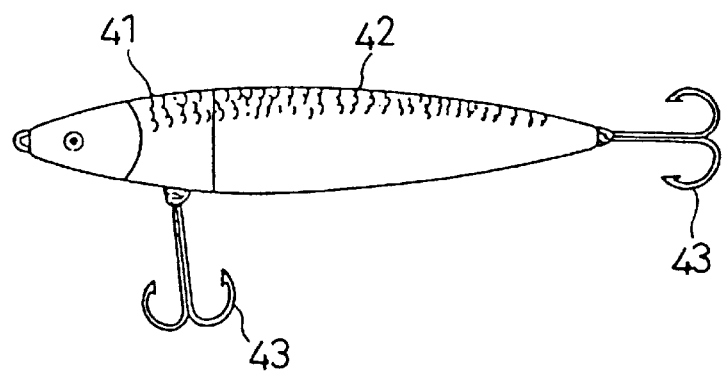
FIG. 10 is a side view illustrating the external appearance of a conventional lure.
Figure 11:
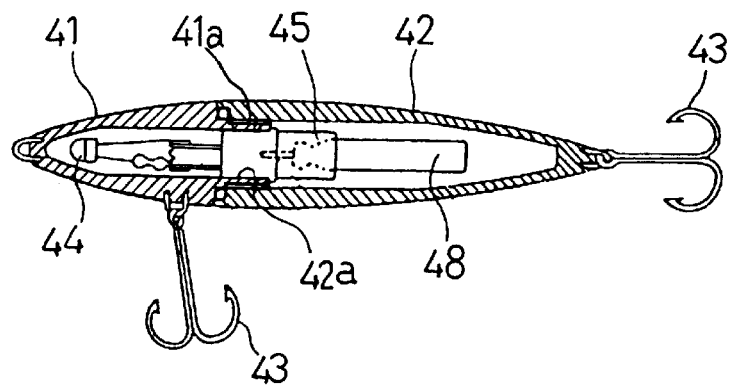
FIG. 11 is a cross-sectional structural diagram illustrating the internal configuration thereof.

When the lid unit 23 is to be released from the main body 22, a fingernail is inserted into the aforesaid notch 27 and pressure is applied to disengage the spring member 35 from the groove 34. The insertion member 28 can then be pulled out smoothly, and the battery 24 and light-emitting diode 25 which have been held within the hollow structure of the insertion member 28 can also be released from within the main body 22. The battery 24 and light-emitting diode 25 comprise a single light-emitting unit 29 as illustrated in FIG. 9. They are held in a retaining member 30, into which the light-emitting diode 25 is fitted, in such a manner that the cylindrical battery 24 can be attached and detached.

As may be seen from FIG. 6, once the lid unit 23 is released from the main body 22, the light-emitting unit 29 can be removed to the outside from within the main body 22. The light-emitting unit 29 is retained by the insertion member 28 in such a manner that it can be attached and detached freely. Similarly, the battery 24 is retained by the retaining member 30, into which the light-emitting diode 25 is fitted, in such a manner that the battery 24 can be attached and detached freely. When the light-emitting lure is not in use, the electrode unit 24a of the battery 24 can be reversed and inserted into the retaining member 30 as illustrated in FIG. 9(a). If so, the light-emitting diode 25 will not illuminate. If the electrode unit 24a of the battery 24 is then inserted into the retaining unit 30 so as to face inwards, it is connected to the light-emitting diode 25, and the light-emitting diode 25 illuminates. In this manner the light-emitting lure can be switched on and off simply by inserting and removing the battery 24, and the battery 24 can be replaced by the same operation when it is spent.

The operations of changing the battery and switching the light-emitting diode 25 on or off are performed by removing the lid unit 23 from the main body 22, which can be accomplished at a single touch by inserting a fingernail into the notch 27 as already described. The lid unit 23 can be fitted by a simple operation of insertion. Accordingly, there is no need for the time-consuming operation of screwing or unscrewing as with conventional screw-type lures, and the fact that no exaggerated action is involved means that it is possible to avoid the risk of injuring the fingers with the hook 5 while attaching or detaching the lid unit 23. Moreover, since in the structure to which the present embodiment pertains there is no hook 5 attached to the lid unit 23, there is even less risk of getting the fingers caught on a hook.

The lure B of the abovementioned structure can be used as a light-emitting lure by inserting the battery 24 into the retaining member 30 in the direction shown in FIG. 9(b), fitting the light-emitting unit 29 into the lid unit 23 with the light-emitting diode 25 switched on, and inserting the lid unit 23 into the main body 22. Light from the light-emitting diode 25 in the form of both direct light and light reflected by the reflective sheet 31 is scattered by the glass beads 32 and radiated outwards through the light-emitting portion P, which stretches from either side of the head towards the underside and has been left translucent during painting. Bright light from a lure of this sort can easily be recognised by fish over a wide area in a lateral direction, while a hopper-type lure such as the lure B to which the present embodiment pertains moves close to the surface of the water and is therefore easily recognisable to fish swimming underneath it by the light from the underside.

The above second embodiment has been described in terms of a hopper-type lure, but it can also be structured in the form of a minnow-type or other lure.

There follows an explanation of the effect which is obtained as a result of the characteristic light-emitting portions on the lure which are adopted in the lure B of the abovementioned structure and the lure A to which the first embodiment pertains.

Inasmuch as fish have eyes positioned one either side of the head, in the majority of cases they see different things with each eye rather than the same thing with both eyes. This means that objects in a lateral direction are not clearly visible, but they are able sensitively to detect a wide range of movement. This is how fish watch for enemies and look for food, and it allows the light of the lures A, B to be recognised by fish even at a distance. Consequently, lures A, B are more likely to be recognised by fish than ordinary lures. Especially during the few hours at dawn and from sunset when fish are most easily caught, ordinary lures are hard to see, while the lures A, B exhibit their efficacy in attracting fish thanks to the light they emit.

Once fish take an interest in an object which has caught their attention in this manner, they head in the direction of that object. If they discern that it is food, they approach and begin to chase it. When they are chasing a moving light-emitting lure, they are seeing it from behind. As a result, the light emitted from the head section of the lure appears dimmer, and is not felt to be incongruous by the fish which approach it as a bright light would be. Thus, even if the fish chasing the lure see it clearly, it does not inspire any feeling of incongruousness in them. When they try to take the bait, they become caught on the hooks 5 and are landed.

INDUSTRIAL APPLICABILITY

As has been explained above, the present invention can be applied to a light-emitting lure wherein either the battery does not require to be changed, or if does, this can be performed in a simple manner, and which offers improved efficacy in catching fish.

We claim:
1. A lure, comprising:
a fish-shaped case having a shape resembling a fish;
a light-emitting body located on a head side within said fish-shaped case;
a stretch of surface of the fish-shaped case from either side of head thereof towards an underside of said fish-shaped case being being illuminated by light from the light-emitting body; and
a reflective surface being provided closer to a head side of the fish-shaped case than a position in which the light-emitting body is located, in order to reflect the light from the light-emitting body in the direction of the underside.

2. A lure, comprising:
a fish-shaped case formed of a translucent material into a shape resembling a fish;
a light-emitting body housed within said fish-shaped case;
a solar battery;
a secondary battery which is charged by said solar battery;
light emission driving means for illuminating said light-emitting body with the secondary battery as a power source therefor; and
control means for switching the secondary battery between charge and discharge states;
a design imitating a body of a fish being depicted on a surface of the fish-shaped case, leaving translucent a portion facing a light-receiving surface of said solar battery and a prescribed portion through which light from said light-emitting body is radiated.

3. The lure according to claim 2, wherein the light emission driving means includes an oscillator circuit and a booster circuit.

4. The lure according to claim 2, further comprising:
a pair of electrodes which protrude from the surface of the fish-shaped case, said pair of electrodes comprising
water detection means for detecting continuity between said pair of electrodes, the control means being operated by said water detection means.

5. A lure, comprising:

a fish-shaped case having a shape which resembles a fish, said fish-shaped case including a main body and a lid unit which serves to close an aperture in which an internal space formed within the main body is open to an exterior thereof;

a light-emitting body, which emits light with a battery as a power source, housed within said fish-shaped case attachment and detachment of the lid unit being implemented by inserting a prescribed portion thereof into and releasing said prescribed portion from the said main body in a longitudinal direction thereof; and a reflective surface being provided closer to a head side of the fish-shaped case than a position in which the light-emitting body is located, in order to reflect the light from the light-emitting body in the direction of the underside.

6. The lure according to claim 5, wherein the lid unit has a notch into which a fingernail may be inserted in order to release the lid unit from the main body.

7. The lure according to claim 5, wherein the battery and the light-emitting body are retained by the lid unit while the lid unit is fitted into the main body, thereby allowing the battery and the light-emitting body to fit in prescribed positions within the fish-shaped case.

8. The lure according to claim 5, wherein the light-emitting body is located within a head portion of the fish-shaped case, such that a stretch of surface of the fish-shaped case from either side of the head portion towards an underside of the fish-shaped case is illuminated by light from the light-emitting body.

9. The lure according to claim 5 or claim 8, wherein beads are provided in the vicinity of the position in which the light-emitting body is located, in order to scatter the light.

10. A lure, comprising:

a fish-shaped case having a shape which resembles a fish, said fish-shaped case including a main body and a lid unit which serves to close an aperture in which an internal space formed within the main body is open to an exterior thereof;

a light-emitting body, which emits light with a battery as a power source, housed within said fish-shaped case; attachment and detachment of the lid unit being implemented by inserting a prescribed portion thereof into and releasing said prescribed portion from the said main body in a longitudinal direction thereof; and the aperture including a flange protruding from an internal periphery of the aperture towards the center thereof, and a spring member having an urging force which acts in a direction intersecting at right-angles the direction the lid unit is inserted and released, a prescribed position on the lid unit coming into close contact with said flange by engagement of the spring member with a concave section formed in said prescribed position on the lid unit, thereby serving to close the aperture tightly and hold the lid unit onto the main body.

11. The lure according to claim 10, wherein a reflective surface is provided closer to a head side of the fish-shaped case than the position in which the light-emitting body is located, in order to reflect the light from the light-emitting body in the direction of the underside.

12. The lure according to claim 10, further comprising an O-ring in a prescribed position on the lid unit which contacts closely with the flange.

13. The lure according to claim 10, wherein the lid unit has a notch into which a fingernail may be inserted in order to release the lid unit from the main body.

14. The lure according to claim 10, wherein the battery and the light-emitting body are retained by the lid unit while the lid unit is fitted into the main body, thereby allowing the battery and the light-emitting body to fit in prescribed positions within the fish-shaped case.

15. The lure according to claim 10, wherein the light-emitting body is located within a head portion of the fish-shaped case, such that a stretch of surface of the fish-shaped case from either side of the head portion towards an underside of the fish-shaped case is illuminated by light from the light-emitting body.

16. The lure according to claim 10, wherein beads are provided in the vicinity of the position in which the light-emitting body is located, in order to scatter light generated thereby.

* * * * *